United States Patent
Egmond et al.

(10) Patent No.: US 8,879,913 B2
(45) Date of Patent: Nov. 4, 2014

(54) DEVICE FOR USING A BROADBAND NETWORK AT A CUSTOMER'S PREMISES, METHOD OF OPERATING SUCH A DEVICE AND BROADBAND NETWORK SYSTEM UTILIZING SUCH A DEVICE

(75) Inventors: Maarten Egmond, Eindhoven (NL); Gerard Nicolaas Van Den Hoven, Maria Hoop (NL); Paulus Ferdinand Joseph Schepers, Eindhoven (NL); Maurice Martinus De Laat, Budel (NL); Jori Pieter Andre Spaa, Amsterdam (NL); Jacob Hendrik Martin Berends, Den Haag (NL)

(73) Assignee: Genexis B.V., Eindhoven (NL)

( * ) Notice: Subject to any disclaimer, the term of this patent is extended or adjusted under 35 U.S.C. 154(b) by 199 days.

(21) Appl. No.: 13/575,714

(22) PCT Filed: Jan. 13, 2011

(86) PCT No.: PCT/EP2011/050396
§ 371 (c)(1),
(2), (4) Date: Nov. 12, 2012

(87) PCT Pub. No.: WO2011/092060
PCT Pub. Date: Aug. 4, 2011

(65) Prior Publication Data
US 2013/0156430 A1  Jun. 20, 2013

(30) Foreign Application Priority Data
Jan. 28, 2010 (NL) ..................................... 2004168

(51) Int. Cl.
*H04B 10/27* (2013.01)
*H04Q 1/02* (2006.01)

(52) U.S. Cl.
CPC .............. *H04B 10/27* (2013.01); *H04Q 1/028* (2013.01)
USPC ....... 398/58; 379/230; 379/90.01; 379/93.01; 455/349; 398/71; 370/389; 370/452

(58) Field of Classification Search
CPC ............. H04B 10/27; H04Q 1/02; G02B 6/43

USPC ............................................. 398/58; 455/349
See application file for complete search history.

(56) References Cited

U.S. PATENT DOCUMENTS

| 6,104,921 | A * | 8/2000 | Cosley et al. ................. 455/349 |
| 7,272,274 | B1 | 9/2007 | Albers et al. |
| 2002/0071533 | A1 * | 6/2002 | Meeske ..................... 379/93.05 |
| 2003/0099259 | A1 | 5/2003 | Perini et al. |
| 2003/0147513 | A1 * | 8/2003 | Goodman .................. 379/90.01 |

(Continued)

FOREIGN PATENT DOCUMENTS

| CN | 101632258 | 1/2010 |
| EP | 1931085 | 6/2008 |

(Continued)

OTHER PUBLICATIONS

International Search Report for PCT/EP2011/050396, dated Apr. 1, 2011.

(Continued)

*Primary Examiner* — David Payne
*Assistant Examiner* — Omar S Ismail

(57) ABSTRACT

The invention relates to a piece of customer premises equipment (CPE) comprising a physical connector (21) for linking to a broadband network and a distributing structure (NTU, 24) that is connected to said physical connector for distributing broadband elements over one or more service modules (RGUs A, B, C, D) for associated customer modules (CUEs E, F, G, H). According to the invention, said distributing structure (NTU, 24) comprises a plurality of mechanically modularly arranged connector facilities (25) at an interface between the distributing structure and the service modules so as to provide a repeatedly mechanically exchangeable connection for a service module (RGU) belonging to one service provider from a range of mutually distinct service providers each time. The distributing structure (NTU, 24) is further provided with means (26, 27) for making said mutually distinct service providers indiscriminately exchangeable among said connector facilities (25).

14 Claims, 7 Drawing Sheets

(56) References Cited

U.S. PATENT DOCUMENTS

2003/0165229 A1* 9/2003 Emley et al. .................. 379/230
2010/0247050 A1 9/2010 Ejvinsson et al.

FOREIGN PATENT DOCUMENTS

| EP | 1931085 A1 * | 6/2008 | ............. H04L 12/28 |
| EP | 2095573 | 9/2009 | |
| WO | 2008/068316 | 6/2008 | |

OTHER PUBLICATIONS

Written Opinion for PCT/EP2011/050396, dated Apr. 1, 2011.

* cited by examiner

DEVICE FOR USING A BROADBAND NETWORK AT A CUSTOMER'S PREMISES, METHOD OF OPERATING SUCH A DEVICE AND BROADBAND NETWORK SYSTEM UTILIZING SUCH A DEVICE

This application is the U.S. national phase of International Application No. PCT/EP2011/050396 filed 13 Jan. 2011 which designated the U.S. and claims priority to NL Patent Application No. 2004168 filed 28 Jan. 2010, the entire contents of each of which are hereby incorporated by reference.

BACKGROUND OF THE INVENTION

The invention relates to a device for using a broadband network at a customer's premises—referred to hereinafter as Customer Premises Equipment or CPE for short—comprising a physical connector for linking to a broadband network and a distributing structure (Network Termination Unit, NTU) that is connected to said physical connector for distributing broadband elements over one or more service modules (Residential Gateway Units, RGU) for associated customer modules (Customer Equipment, CUE) as recited in the pre-characterizing part of claim 1. The broadband network may be based on a glass fiber or copper technology. Examples of copper technology are ADSL (Asymmetric Digital Subscriber Line) through a telephone cable and DOCSIS (Data Over Cable Service Interface Specifications) through a TV cable. Examples of customer modules are appliances for recording and/or playback of data or audio and/or video information, such as a TV set, a monitor, a PC (personal computer), a telephone set, a webcam, etc. It is noted that customer location equipment is sometimes also denoted customer equipment hereinafter. Customer modules are also sometimes denoted user equipment.

The inventors have found in particular that until now it has often been only a single network manager or service provider that supplies all elements of such a connecting structure. The latter comprises the physical infrastructure, the means for carrying out the active management of the network, and the structures that provide the various services to the end users.

A social trend is observable, however, whereby the right of property of the connecting structure is distributed over a number of operational entities or service providers. Furthermore, there is a technological trend in the sense that the operational lives of the individual components and sub-systems are of substantially different lengths, for example ranging from several decades for underground cabling to only a few years for applications. A subsequent replacement of physical subsystems within a larger system is found to be highly laborious. It requires, for example, that a qualified maintenance engineer is sent to the customer for replacing the entire customer equipment. This involves a major expense.

SHORT DESCRIPTION OF THE INVENTION

It is accordingly an object of the invention to provide a customer premises equipment for a broadband application which, having a modular arrangement, is suitable for the use of service modules from different service providers as well as for updating a hardware/software structure in a simple manner as improved components become available.

The invention in one of its aspects is for this purpose characterized in that said distributing structure (NTU) comprises a plurality of mechanically modularly arranged connector facilities at an interface between said distributing structure and said service modules so as to provide a repeatedly mechanically exchangeable connection for a service module (RGU) belonging to one service provider from a range of mutually distinct service providers, and in that said distributing structure (NTU) is provided with means for making said mutually distinct service providers indiscriminately exchangeable among said connector facilities, all this as defined in the characterizing part of claim 1. In this manner, for example, different service applications can be exchanged via a plug-in connection without additional cabling being required for this.

A service module offers the service(s) to the customer via the user ports available on the module. In the present context the service module, also called Residential Gateway Unit or RGU, offers one or several services originating from a (single) service provider. A (single) service provider may supply and use a plurality of service modules. A service module converts broadband signals (portions of the broadband) into signals that are of use to the customer, which signals are made available at user ports to which the user equipment or user module can be directly connected. Examples of services offered through the service module are: telephony (Voice-over IP or VoIP), digital TV (IP-TV), internet, but also specific services such as e-metering for obtaining the meter readings of, for example, gas and electricity, or remote medical care.

In addition to service modules (RGU) it is also possible to place expansion units (EXU) on the connector facility. In a typical embodiment there will be a maximum of four service modules or expansion modules that can be placed on an NTU. The expansion module (EXU) does not communicate with the NTU directly, but always via an RGU. The communication paths may or may not run physically through the NTU. The expansion module accordingly belongs to a service module. The expansion module provides an expansion of the functionality of the service module. A frequently used expansion consists in the increase in the number of user ports belonging to the service or services offered by the coupled service module (RGU). An example of this is that the service offers additional network ports to the customer for connecting more user appliances, or that the relevant service is offered via a different kind of medium, for example wirelessly in accordance with a given wireless standard or via POF (Polymer Optical Fiber). Many alternative versions of the EXU are possible. This increases the flexibility for the customer.

According to a preferred embodiment, the distributing structure is provided with means for rendering both service modules (RGU) and respective expansion modules (EXU) exchangeable, without regard to differences in service applications, by means of mechanical connection to said connector facilities. This enhances the flexibility.

According to a preferred embodiment, a combining module is provided for joining together several services at media/user ports through connection of a plurality of connector facilities of respective service modules. The combining module combines the several services, offered via various service modules, at one or several user ports/media. This is found to be favorable in practice, for the customer can combine all services on one or several media in a house such that all services are made available everywhere in the house.

According to a preferred embodiment, said connector facilities are operative between an NTU and an RGU by means of an abutment element that acts in one direction and a plug-in connector that acts in a second direction transverse to the first direction. This is found to be a practically convenient configuration.

According to a preferred embodiment, the distributing structure and the one or several service modules are each provided with a separate processor. The control and operation of two processes in a method of operating a device according to the invention, which method will be discussed further below, can thus be carried out independently for these two processes. The first process, which comprises the transport of data to the customer's premises, is then carried out in the distributing structure, whereas the second process, which comprises the conversion of the transported data into services useful to the customer, is carried out in the RGU. The processor of the NTU is then preferably arranged orthogonal to the distributing structure. This means that the data streams are not interfered with by the processor, but that nevertheless the processor is capable of controlling these data streams, which thus flow directly to the distributing structure.

According to a preferred embodiment, the customer equipment is accommodated in an enveloping housing with plug-in connectors for RGUs and/or EXUs. This is found to be a convenient configuration. Various designs are possible for the connector. It is possible to transport the broadband elements in parallel via an electrical connection from NTU to RGU and vice versa. A serial solution is favorable because it requires fewer physical connection lines between NTU and RGU. The serial connection may be realized as an electrical connection. An optical link was found to have advantages, however. In a widely used form of an optical link, two pairs, each consisting of a transmitter element (for example a laser) and a receiver element (for example a photodetector), are generally placed at a short distance opposite one another. One pair of this optical link is present in the NTU and one pair in the RGU. In a typical embodiment in which four RGUs or EXUs can be placed on the NTU, a total of four pairs of transmitter elements and receiver elements will then be present on the NTU. Further advantageous aspects of the invention are recited in the dependent claims.

The invention also relates to a method of operating a device according to the invention, wherein two processes are carried out in the broadband network, comprising a first process in which data are transported from the central unit to the customer's location and a second process in which the data are converted into services useful to the customer, the first process being carried out in the distributing structure and the second process being carried out in the service module. The exchangeability of the service providers in a device according to the invention and the fact that one or more customer modules can be connected render it possible for the second process to be carried out by one or several parties simultaneously and independently. All this is made possible in practice in that both the distributing structure and the one or more service modules are each provided with a separate processor, so that the control and/or management thereof can be carried out independently. Since all elements are accommodated in a single device, the user will regard this as a unit and is not hindered by the separation of functions in the two processes. In a preferred embodiment of the method according to the invention, the customer connects the service module to a port of the distributing structure, the distributing structure requests an input from the customer after acknowledging the connection, the customer provides the input, and the distributing structure couples the input to configuration data and applies these to the connected port by which the broadband network realizes the connection between a service provider and the connected service module, and thus to the customer. The configuration data comprise inter alia the setting of the distributing structure, i.e. how one or more service modules are connected to the distributing structure, as well as matters such as VLAN (Virtual Local Area Network), priority and bandwidth.

In contrast to a model in which everything is integrated into a single piece of active equipment or a model in which a plurality of discrete items of active equipment are used, the present invention offers as it were a hybrid concept in which several discrete items of active equipment are coupled in a modular manner, while at the same time auxiliary sources such as processors and memory are separately available to each module, so that the various providers can operate fully independently of one another and of the network administrator.

The invention further relates to a broadband network system provided with a device according to the invention. Said broadband network system according to the invention is preferably realized as a glass fiber communication system. The term 'glass' herein also covers quartz or synthetic resin or some other substance that is suitable for transporting optical signals.

A communication bus may be present for management and control tasks. This bus then facilitates a management protocol. Management and control communication may alternatively take place in-band via the data link. EXUs do not require a central control in principle but they may be controlled locally by or through the RGU.

SHORT DESCRIPTION OF THE DRAWING

These and other properties, aspects, and advantages of the invention will be explained in more detail below in the description of preferred embodiments of the invention and more in particular with reference to the appended Figures, in which:

FIG. 8 is similar to FIG. 7, but with two service modules and one expansion module snapped on;

FIG. 9 is similar to FIG. 8, but now with four service modules and one combining module snapped on;

DETAILED DESCRIPTION OF PREFERRED EMBODIMENTS

Broadband connections for private homes and the like are usually made available nowadays via the telephone cable in the form of ADSL/VDSL or via the TV cable in the form of DOCSIS (Data Over Cable Service Interface Specifications), or increasingly via a glass fiber. As the market becomes more open, initial monopolies start to crumble. At the moment there are two solutions for the customer equipment in an environment with a single network administrator or service provider.
a. A single envelope or box contains all the necessary components, and each new service or each (hardware) improvement necessitates a replacement of the overall equipment. This also applies when any component becomes defective. The severity of this problem increases as the complexity increases and also as the number of different services or facilities increases. Examples here are the regularly changing wireless communication standards. This situation also renders test procedures ever more complicated.
b. In an alternative realization, the individual functions are divided among a plurality of envelopes or boxes. Although in principle the potential and actual flexibility may strongly increase, several disadvantages arise here. The respective boxes are interconnected by cables in many cases. Such cables as well as the associated connectors may fracture when contact is made or broken. Also, the above actions will often be performed by non-experts, which may lead to defects. Such cable systems are furthermore defined for longer connections than the ones required for the environment envisaged here. All boxes, moreover, require some sort of supply. This leads to a higher energy consumption of the total number of boxes. The respective constituent boxes, however, communicate only at the service information level and the resulting isolation at other levels implies that each box is to be designed in greater detail than in a more coherent organization. The larger number of boxes also occupies comparatively much space, for example in a so-termed meter cupboard. Finally, the presence of a plurality of entities that design boxes is found to cause a consistency problem that is difficult to solve.

The present invention renders the customer equipment or CPE (Customer Premises Equipment) comprehensive, modular as to its construction, mechanically causal and clearly structured, so that a customer can provide the correct connection in an associated receptacle without any problem.

Figure 1:
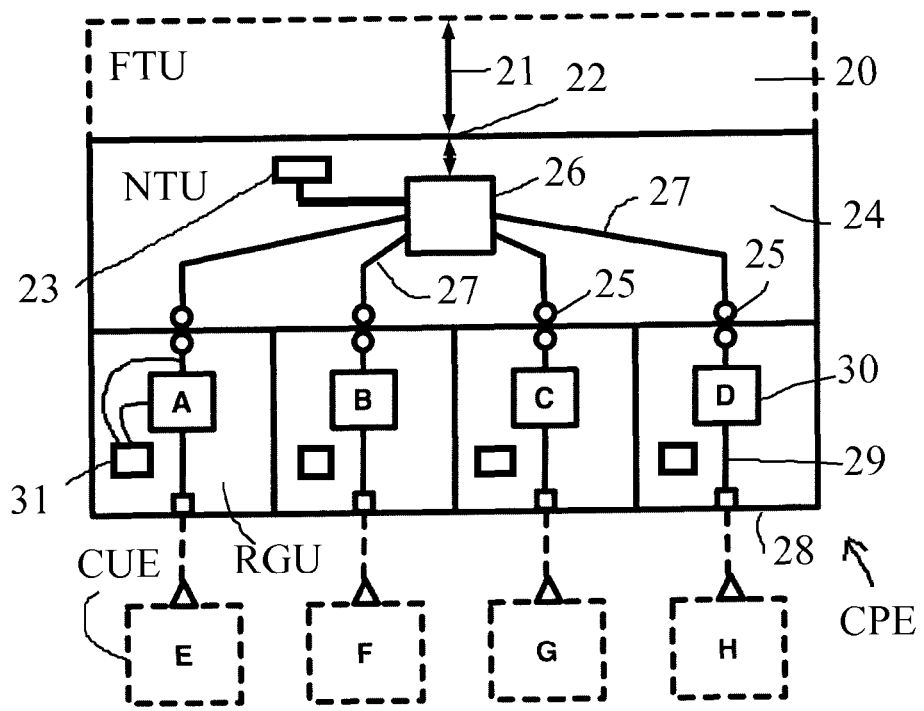
FIG. 1 is a general picture of a modular system in three layers.

FIG. 1 is a general view of a three-layered modular system. At the lowest level or layer 20, the module is a passive FTU (Fiber Termination Unit) which is connected to the network via a fiber 21. This FTU is used for enveloping and protecting the coiled glass fibers that enter a building. In addition, one or more connectors may be present in this layer at 22 for connection to the next layer. The layer 20 only needs a simple electrical connector if the network is based on electrical connections.

At the next level 24 there is a distributing structure/network termination unit (NTU) for terminating the broadband connection and converting the signal into several, typically electrical connections to the modules of subsequent layers. Lines 27 transport service data in accordance with, for example, the Ethernet protocol (IEEE 802.3). The distributing structure NTU 24 comprises a switching chip 26, which is the component that actually splits the broadband elements up for distribution among the service modules and which is provided with a separate processor 23 here. The latter is preferably connected in an orthogonal orientation—as shown in the drawing for this example—such that data streams can be controlled but cannot be hampered by the processor 23.

At the highest level shown 28, service modules 30 pass one or more services on to the end user. The relevant user protocol is defined on lines 29, for example for Ethernet, Coax, POF, wireless, etc. Each service module 30 is again provided with a separate processor 31. The processes carried out in the distributing structure 24 and the service modules 30 can thus be performed, i.e. controlled and/or managed, independently of one another. The further processor 31 may be connected in two manners, both of which are shown in FIG. 1. Firstly, connection in an orthogonal orientation relative to a service module A, B, C, D, and secondly, directly behind the connector 25. It will be clear that one of the two possibilities is chosen in practice.

The modular arrangement is chosen such that it corresponds to the roles expected by the individual entities or organizations involved in the creation of such an open network. More in particular, each entity can see where the limits lie within the system, and fewer auxiliary sources will be the subject of a competence struggle. On the other hand, this modular CPE is as attractive and profitable as a single box because no initial and half-way replacement expenses are incurred for the entire operation. The cost of the NTU is borne by the network administrator and the cost of the RGU by the respective service providers. Furthermore, it will be easier for all entities involved to create their own strategies of cooperation. The service modules are interchangeable for greater flexibility. This means that the individual service modules do not have to occupy a fixed location on the distributing structure/network termination unit. The connector joints 25 between the lines 27 and the service modules 30 A, B, C, D are freely interchangeable. The customer modules CUE E, F, G, H may accordingly be shifted between the lines 27, but generally in combination with the respective associated service modules 30 A, B, C, D. It is obviously not necessary for all customer modules to be actually physically present.

The above implies that the device of this example is highly suitable for use in a method according to the invention, wherein the functions of data transport and data conversion are accommodated in the distributing structure and in the service module(s), respectively. The control and/or management of the distributing structure and the service module(s) then take place independently. This separation of functions, the interchangeability, and the fact that one or several service modules can be connected have the result that the second function can be performed by one or several parties (service providers) simultaneously and independently. A flowchart of this so-termed hybrid provisioning according to the invention would look as follows, for example:

the end user connects a service module RGU to a port or slot of the distributing structure NTU;
the distributing structure NTU acknowledges this (or the user him/herself indicates this) and the NTU asks the user for input;
the user provides the input, for example by entering a code or selecting from a list displayed to him/her;
the distributing structure NTU couples the input from the user to configuration data and applies these to the relevant port or slot just occupied;
the transport network finally realizes the connection between a service provider and the service module RGU thus connected, i.e. the customer.

Figure 2:
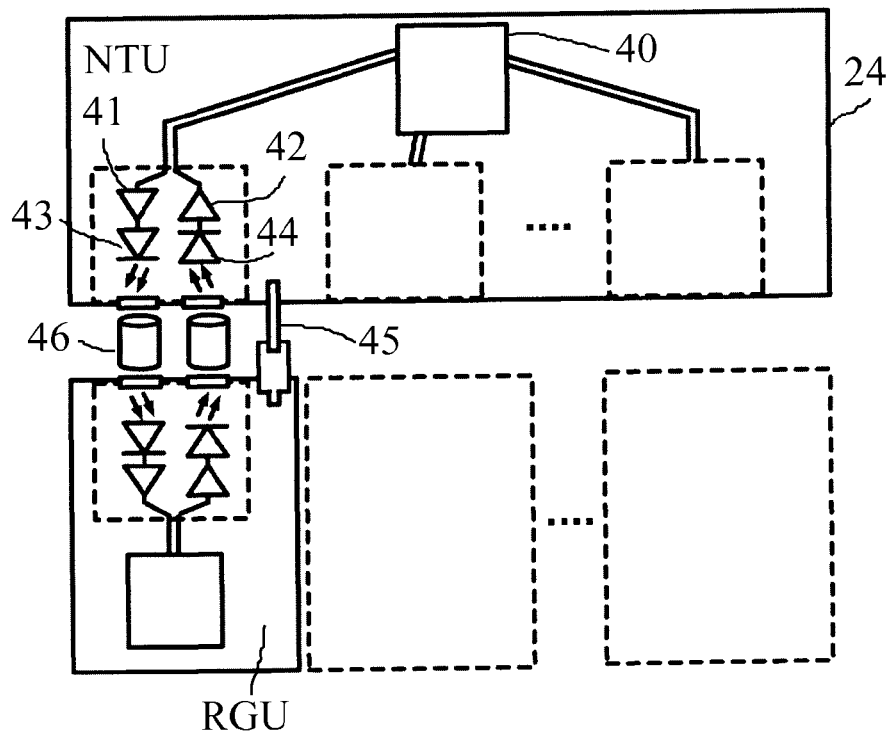
FIG. 2 shows the optical communication between a termination unit of the distributing structure and the network on the one hand and service modules on the other hand.

FIG. 2 shows the optical communication between the distributing structure/network termination unit NTU and the service modules RGU. Each connection comprises two transceivers, in their turn each comprising a receiver element (photodetector) 44, a converter (so-termed transimpedance and limiting amplifiers) 42, a back converter (laser driver) 41, and a transmitter element (laser, VCSEL, or LED) 43. Each converter is connected so as to couple into an optical connector 46 by means of a waveguide or lens. The optical connection is capable of realizing high broadband speeds in a compact and contactless manner without hindrance from dust or dirt. No mechanical contacts need be made for light which travels a short distance between respective waveguides, so the design can be simple. The force required for achieving a connection is also smaller, which renders it possible to realize a connection between the various NTU and RGU modules in a clear and simple manner. Do-it-yourself installation by the customer is thus made simple and reliable. Even if the connection is wholly or partly realized by means of the mechanism to be discussed with reference to FIG. 5 below, the replacement of electrical conductor tracks by an optical link will still be advantageous in many cases. Current supplies between NTU and RGU may be provided in a conventional manner as indicated by a connector provision 45. Block 40 symbolizes the connecting networks to preceding/subsequent layers of the structure.

Figure 3:
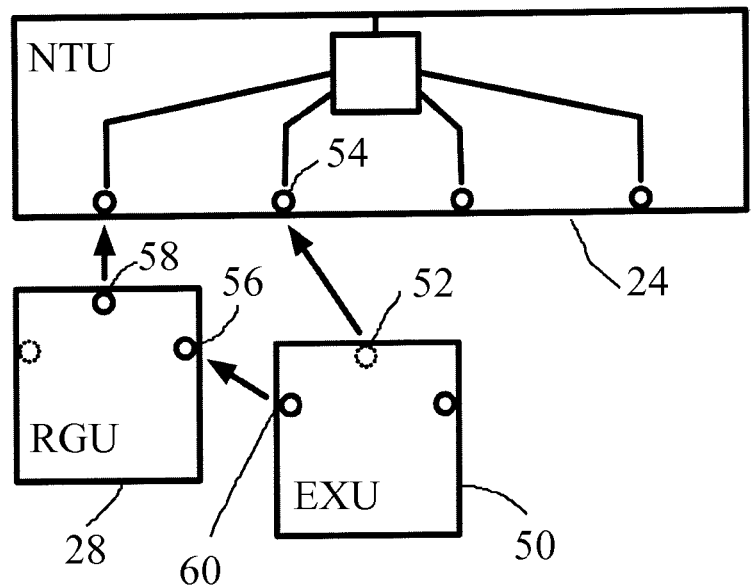
FIG. 3 shows an implementation of a direct through connection.
Figure 4:
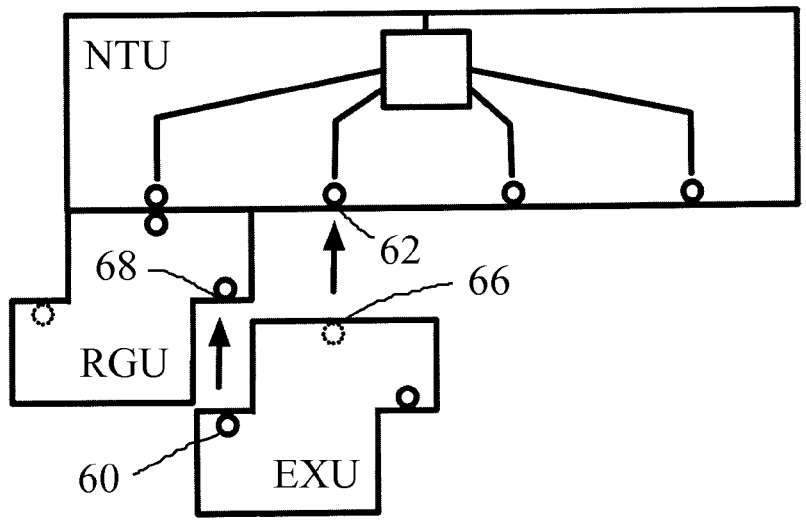
FIG. 4 shows an alternative implementation thereof.
Figure 5:
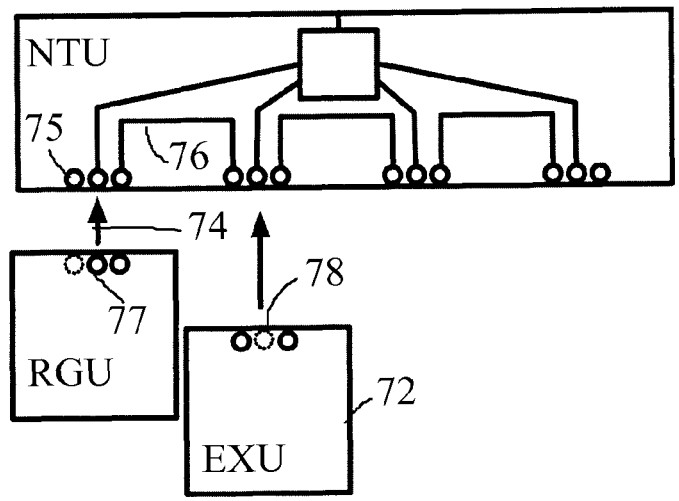
FIG. 5 shows a different method of connecting according to the invention.

FIG. 3 shows an implementation of a direct through connection as is useful, for example, when an expansion is required with additional aspects such as, for example, a different medium or wireless facilities. FIGS. 3 to 5 are diagrammatic; a perspective view will be given later. The same connector facilities will be used for the expansion module 50 in FIG. 3 as for the standard RGUs 28. An optimum configuration for the connector units then comprises an input 60 to an RGU 28 (if present) on the left and an RGU input 58 for contact with the NTU 24. It will be clear that the simultaneous realization of two contacting directions at an angle to one another (52/54 and 56/60) leads to a contorted construction that is sometimes difficult to connect in a reproducible manner.

FIG. 4 shows another implementation of the solution principle of FIG. 3, where two pairs of contacts 60/68 and 62/66 are to be realized. A connecting mechanism is thus provided for each module that acts in one direction. Now, however, a certain sequence limitation applies to the mounting of various EXU and RGU modules, because this mounting involves a certain "roof tile" overlap. Either the sequence in which the various modules can be provided is limited thereby, or a certain location has to be skipped if an adjoining location is already occupied.

FIG. 5 shows an alternative connecting method according to the invention. Since a connecting mechanism 75/77 is present already between NTU and RGU, an increase in the number of pins within a connector will generally be less costly than the provision of an additional connector. The mechanical force required for inserting or connecting the connector will also be smaller then. Furthermore, the internal path 76 inside the NTU module between the RGU and EXU modules will be passive, so that no additional components are required inside the NTU.

Figure 6:
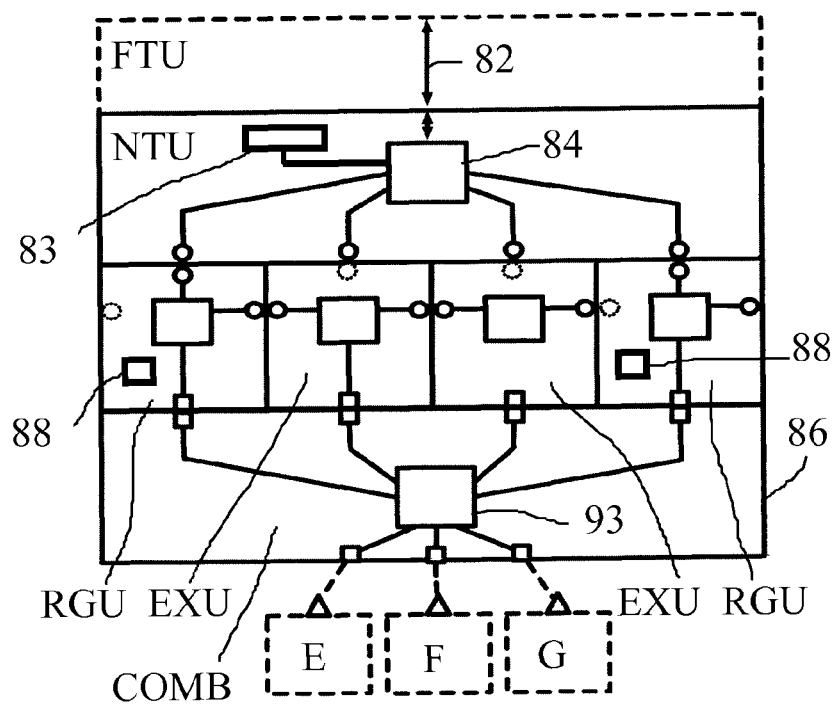
FIG. 6 shows a total connection concept according to the invention.

FIG. 6 represents a total connection concept according to the invention, where two RGU and two EXU modules are directly connected via an optical link 82 and further to a combining or switching module 93. The various modules here provide a local processing of the signals. Again, the distributing structure NTU is provided with its own processor 83. The service modules RGU are equally fitted with their own processors 88, whereas the EXU units do not necessarily have a processor of their own. The connection of the further processor 88 to the service modules RGU is not shown in the drawing; it may be achieved by either of the two methods discussed with reference to FIG. 1.

A simple arrangement merely requires a connection of a single EXU to a single RGU, so that an EXU unit needs fewer connectors and the number of connection points required can be smaller. If the above number is left free, the possibility arises to create more complicated EXUs that can be connected in series as well as simple ones for which this is not true.

A combining module 86 renders it possible to join together all services offered by the RGU modules on a single medium, such as Ethernet cable, Coax, or wireless, so that all services can be used in a simpler manner through an entire building without the creation of multiple transport or cabling structures. Should the user equipment be incapable of deriving the desired service from the combined medium independently, a switch or splitter may be used. Combining without the various service providers interfering with one another can be achieved through a suitable filtering of traffic on both sides of medium. It may be done on an Ethernet cable, for example, in that the data of each RGU are put on a separate VLAN (Virtual Local Area Network), while in the case of a wireless connection, for example, a separate SSID (Service Set Identifier) may be used for this. More detailed possibilities may be to filter the traffic on the basis of the contents of data packages, such as a destination address or part thereof.

As long as the bandwidth of the combined medium is at least equal to the (assigned) bandwidth of the broadband connection the service providers will not interfere with one another on the combined medium as far as bandwidth is concerned. If the bandwidth of the combined medium is less than that, a QoS (Quality of Service) policy such as the one required for the NTU may be extended to the combining module, so that no extra adjustments are necessary.

Electric power is provided via connections (not shown) to all modules and is designed for a typical maximum power per RGU/EXU. In the case of a higher power requirement a unit may be given a suitable external source. Fiber 82 is connected to the distributing structure NTU with a switching chip 84, which here has its own processor 83. The RGUs/EXUs may or may not be included in a circuit. The two RGUs each have a local processor 88 for selectively establishing the connections here and carrying out local control. The total arrangement with all options is shown in FIG. 6, which shows the direct connection lines between RGU and EXU.

Figure 7:
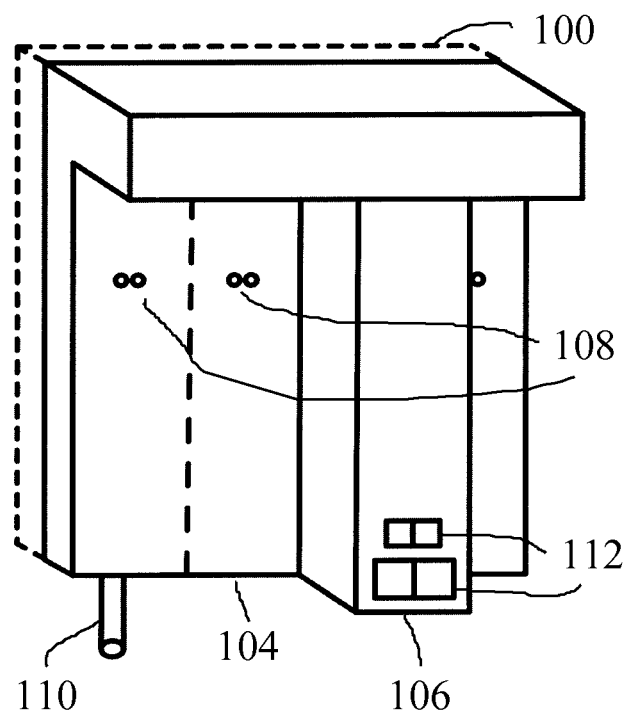
FIG. 7 is a three-dimensional view of an embodiment of the invention with an optical fiber termination unit, a distributing structure and network termination unit, four connector facilities, and one snapped-on service module with user ports.

FIG. 7 is a three-dimensional picture of an embodiment of the invention with an optional glass fiber termination unit FTU 100, a distributing structure/network termination unit NTU 104, four connector facilities 108 of which three are (as yet) unused, and one snapped-on service module RGU 106 with user ports 112. Element 110 is the incoming broadband cable.

Figure 8:
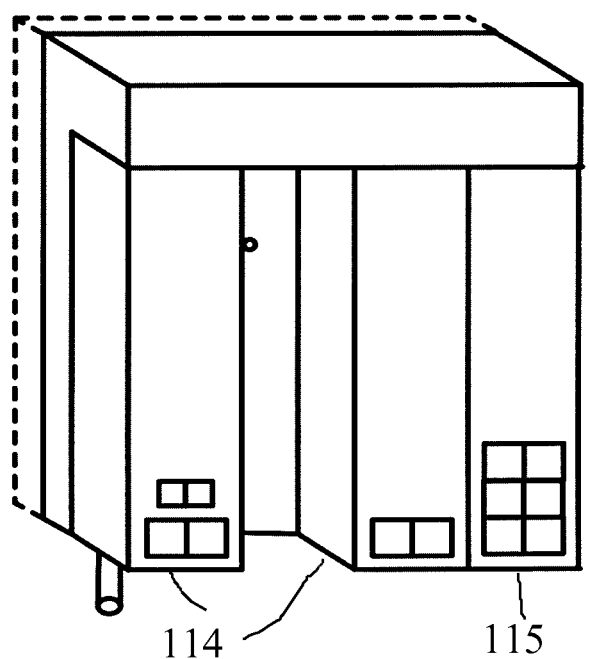

FIG. 8 is an extension of FIG. 7 with two snapped-on, mutually different service modules RGU 114 and one expansion module EXU 115 with further user ports. In this example all connected units 114, 115 have user ports of mutually differing configurations.

Figure 9:
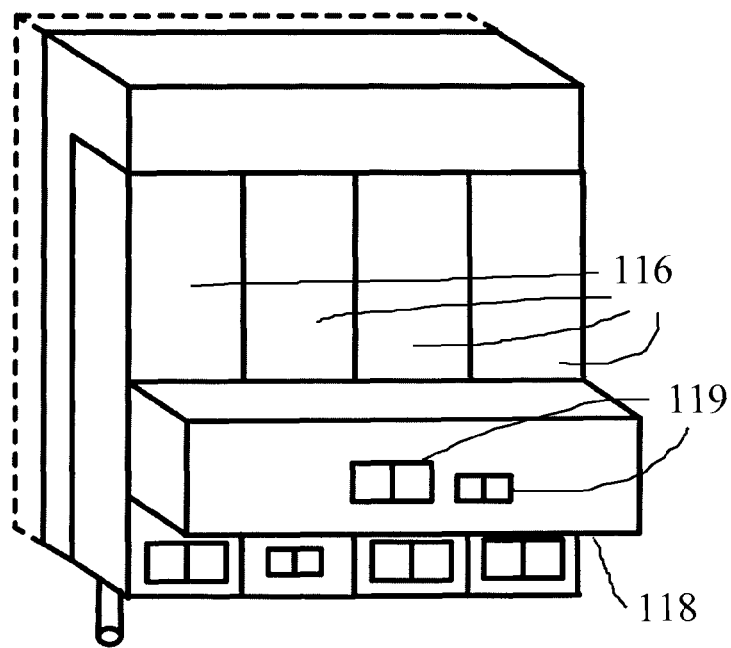

FIG. 9 is an extension of FIG. 8 with four service modules RGU 116 and one combining module 118 inserted. Signals communicated via respective user ports such as 119 can thus cooperate with a single application.

Figure 10:
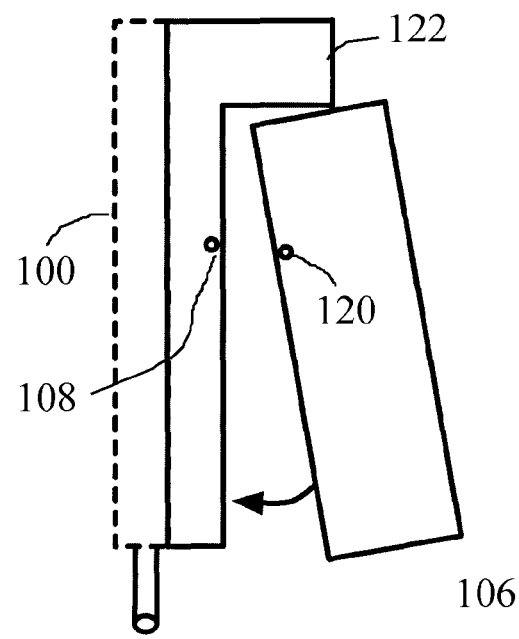
FIGS. 10 and 11 show embodiments in which the connector facilities operate by means of an abutment element acting in one direction and a plug-in connector acting in a second direction transverse to the first direction.
Figure 11:
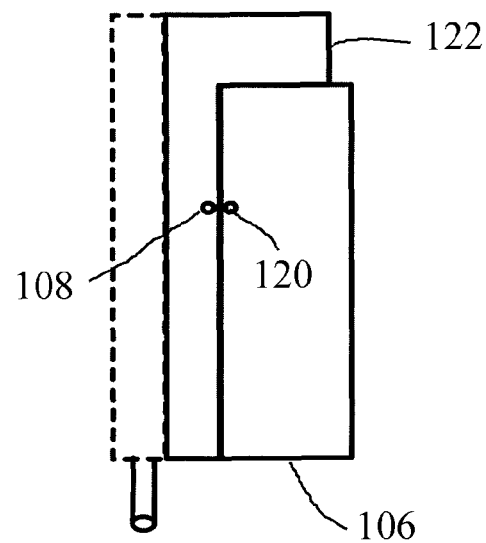

FIGS. 10 and 11 show how connector facilities 108, 120 are operated with the aid of an abutment element, such as a raised edge 122 that acts in one, first direction, i.e. the vertical direction in the Figure. The connector facilities are then inserted in a second direction transverse to this first direction.

Figure 12:
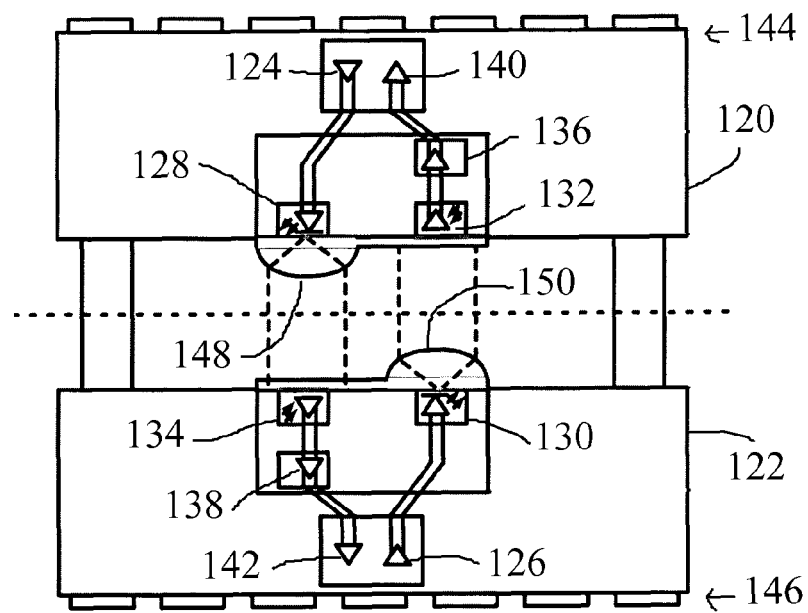
FIG. 12 shows an embodiment of the optical communication link between the distributing structure and network termination unit and the service module.

FIG. 12 shows an embodiment of the optical communication link between the distributing structure/network termination unit and the service module, wherein the optical connection between NTU and RGU is diagrammatically depicted. This optical component is constructed as a component that can be placed on the pc board 120/122 and comprises a laser driver 124/126, a laser 128/130, a photodetector 132/134, a transimpedance amplifier 136/138, a limiting amplifier 140/142, and electrical contact points 144/146. The laser and/or the photodetector further comprise(s) a lens element 148/150 for collimating or focusing the light beam.

Figure 13:
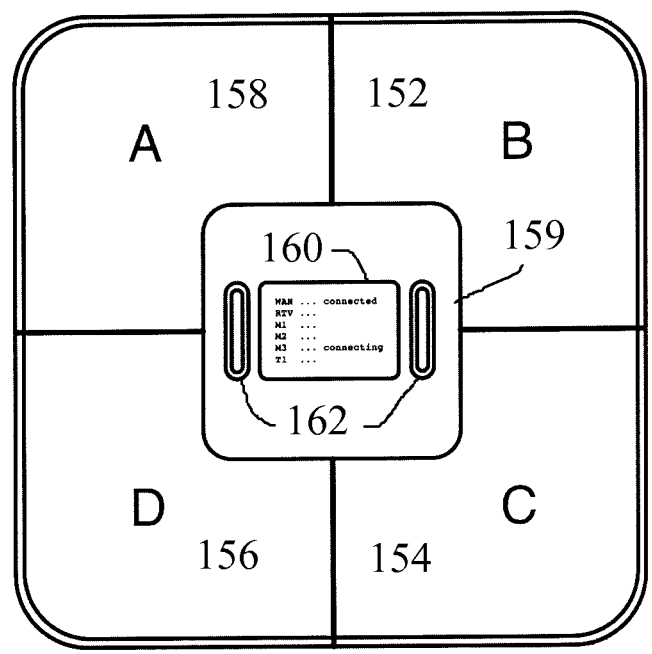
FIG. 13 shows a module with the connector facilities arranged in a circular manner.

FIG. 13 shows a module with connector facilities arranged around a center. No hierarchy obtains any longer among the four connector facilities 152, 154, 156, 158 as a result of this. Details on the connection possibilities can be found in preceding Figures. The central block 159 comprises general provisions such as LEDs 162 which indicate operational states of input buttons and a block 160 with an alphanumerical display of functions.

It is important to distribute the bandwidth optimally among the individual service providers in order to achieve that they have little mutual interference. Since a single connection enters from a broadband network and has to be distributed over a plurality of customer units, this is relevant most of all in the upstream direction for this customer equipment CPE.

Traditionally the distribution of the bandwidth takes place in that specific bandwidths and QoS policies are set on the NTU. The object is to reduce the management cost of the NTUs and the dependencies between service provider and network administrator. Two possibilities are given for this, which will be discussed below.

i) Assigning a fixed (minimum) bandwidth for each service module (customer unit). If a fair distribution of bandwidths is to be achieved without limitation to the service modules, a minimum bandwidth may be assigned to each service module. Any bandwidth not required by a given service module at a certain moment may be automatically distributed over the other service modules. An algorithm may be used for this in which the NTU keeps track of how much data each RGU sends upstream per unit of time and divides the available bandwidth equally over the RGUs, such that any bandwidth portion belonging to an RGU not about to send data at a given moment is made available to the next RGU that does want to send data. In this manner each RGU can utilize the full bandwidth if the other RGUs are not simultaneously active, while no RGU can grab more than a fair portion of bandwidth while a plurality of RGUs are active. The popular name of this procedure is 'Deficit Weighted Round Robin' or DWRR.

ii) Since the RGU is already controlled in a normal situation and a bandwidth is laid down belonging to the type of subscription taken by the customer, the RGU can communicate this information to the NTU, whereupon the NTU independently, i.e. without intervention by the network administrator, can apply the distribution algorithm so as to distribute the available bandwidth over the RGUs in accordance with the requested bandwidth. The NTU will generally provide the requested bandwidth as long as the total requested bandwidth does not exceed the available bandwidth. Should the latter be the case, the NTU will provide a smaller bandwidth, for which priorities laid down for the individual RGUs may be taken into account. If so desired, the bandwidth not required at any given moment may indeed be distributed over the RGUs in either of these cases so as to obtain an optimized connection.

It is important for the RGUs to be exchangeable without limitations among the connector facilities in order to ensure that the CPE (customer premises equipment) is easy to use. This can be achieved in a number of ways.

1. It is set on the NTU which RGU is to be connected to which connector facility. This setting is normally performed by the network administrator, who couples a specific connector facility to a service provider. The user, accordingly, must couple the RGU to a specific connector facility, but this connector facility can be adapted by the network administrator.
2. A unique identification of the RGU, for example a MAC (Media Access Control) address is coupled to a service provider on the NTU. This has the advantage that the user can couple the RGU to a randomly chosen connector facility, whereupon the connection will still lead to the correct service provider. The network administrator, however, must still set the coupling between the RGU identification and the service provider. The RGU may also be coupled to a different connector facility at any moment. It is important in this method that the RGU to be connected first makes known its identification to the NTU, so that the correct settings can be achieved.
3. It is set beforehand on the RGU how it is to be coupled to the service provider via the network ('pre-provisioning'). The RGU communicates previously assigned identification information to the NTU and the NTU establishes the connection between the RGU and the correct service provider on the basis of this information, so that it is irrelevant to which connector facility the RGU is connected. The network administrator does not have to apply any settings in the NTU in this case, and the RGU can again be coupled to any connector facility as desired and can also be easily shifted at any time. A suitable method of pre-provisioning is given by the setting of one or more fixed VLANs on the RGU.

The management of the RGU by a customer (end user) is normally carried out via the RGU itself. In some cases it is carried out in that the RGU is provided with an input interface (for example pushbuttons). It may be advantageous not to provide every RGU with its own input interface, but to provide the NTU therewith. The interface may then be made available to the RGUs through local communication between NTU and RGUs, i.e. the relevant management function for each RGU is made available via the NTU. This provides the customer with a clearly defined control center for the management of the entire CPE while at the same time saving money and space.

A similar argument holds for the EXUs. The customer will usually view the combination of RGU and associated EXUs as one whole and accordingly wish to manage it as one whole. A more traditional form of management of similar customer modules implies that this is often done directly on the module. It may be advantageous in the CPE to make the required management functions of the EXU available not only directly on the EXU but also via one of the existing management interfaces of the RGU. In its most advanced form the management of the EXU can be coupled through via the RGU to the NTU, so that the interface on the NTU can be used for managing the complete set of NTU, RGUs and EXUs.

The invention claimed is:

1. A device for using a broadband network at a customer's premises comprising a physical connector for linking to the broadband network and a distributing structure that is connected to said physical connector for distributing broadband elements over one or more service modules for associated customer modules, characterized in that said distributing structure comprises a plurality of mechanically modularly arranged connector facilities at an interface between said distributing structure and said service modules so as to provide a repeatedly mechanically exchangeable connection for a service module belonging to one service provider from a range of mutually distinct service providers, and in that said distributing structure is provided with means for making said mutually distinct service providers indiscriminately exchangeable among said connector facilities, wherein the distributing structure and the one or more service modules are each provided with a separate processor, the processor of the distributing structure being orthogonally arranged to the distributing structure, so that data streams are not interfered with by the processor, but that the processor is capable of controlling the data streams, which thus flow directly to the distributing structure.

2. The device as claimed in claim 1, wherein the distributing structure is provided with means for rendering both service modules and respective expansion modules exchangeable, without regard to differences in service applications, by means of mechanical connection to said connector facilities.

3. The device as claimed in claim 1, wherein a combining module is provided for joining together different services at media/user ports through connection of a plurality of connector facilities of respective service modules.

4. The device as claimed in claim 1, wherein said connector facilities are operative by means of an abutment element that acts in one direction and a plug-in connector that acts in a second direction transverse to the first direction.

5. The device as claimed in claim 1, wherein said physical connection is provided with a glass fiber termination unit.

6. The device as claimed in claim 1, wherein said connector facilities are included with parallel operation in a chain and are preferably connected in parallel to a central switching unit of said distributing structure.

7. The device as claimed in claim 1, provided with optical communication means between the distributing structure and the service modules.

8. The device as claimed in claim 1 and accommodated in an enveloping housing with plug-in connectors for service modules and/or expansion modules.

9. A The device as claimed in claim 1, wherein a service module on the distributing structure is provided with a fixed address and a fixed coupling between service module identification and service provider.

10. The device as claimed in claim 1, wherein the distributing structure and the service modules directly exchange information locally so as to achieve an optimum distribution of the available bandwidth.

11. The device as claimed in claim 1, wherein the customer can provide input to the distributing structure, which input is used for setting the service modules.

12. A broadband network system comprising a device as claimed in claim 1, wherein the broadband network is implemented as a glass fiber communication system.

13. A method of operating a device as claimed in claim 1, wherein two processes are carried out in the broadband network, comprising a first process in which data are transported from the central unit to the customer's premises and a second process in which the data are converted into services useful to the customer, the first process being carried out in the distributing structure and the second process being carried out in the service module.

14. The method as claimed in claim 13, wherein the customer connects the service module to a port of the distributing structure, the distributing structure requests an input from the customer after acknowledging the connection, the customer provides the input, and the distributing structure couples the input to configuration data and applies these to the connected port via which the broadband network realizes the connection between a service provider and the connected service module, and thus to the customer.

* * * * *

UNITED STATES PATENT AND TRADEMARK OFFICE
CERTIFICATE OF CORRECTION

PATENT NO. : 8,879,913 B2  
APPLICATION NO. : 13/575714  
DATED : November 4, 2014  
INVENTOR(S) : Egmond et al.

Page 1 of 1

It is certified that error appears in the above-identified patent and that said Letters Patent is hereby corrected as shown below:

On The Title Page, item (73) Assignee: delete "Genexis B.V." and insert -- GENEXIS HOLDING B.V. --

Signed and Sealed this  
Twentieth Day of October, 2015

Michelle K. Lee  
*Director of the United States Patent and Trademark Office*